United States Patent
Wibben et al.

(10) Patent No.: US 9,285,812 B2
(45) Date of Patent: Mar. 15, 2016

(54) SOFT START CIRCUITS AND TECHNIQUES

(71) Applicants: Joshua Wibben, New Brighton, MN (US); Robert Stoddard, Lincoln, MA (US)

(72) Inventors: Joshua Wibben, New Brighton, MN (US); Robert Stoddard, Lincoln, MA (US)

(73) Assignee: Allegro Microsystems, LLC, Worcester, MA (US)

( * ) Notice: Subject to any disclaimer, the term of this patent is extended or adjusted under 35 U.S.C. 154(b) by 83 days.

(21) Appl. No.: 13/756,922

(22) Filed: Feb. 1, 2013

(65) Prior Publication Data

US 2014/0217999 A1 Aug. 7, 2014

(51) Int. Cl.
G05F 1/56 (2006.01)
G05F 1/46 (2006.01)
H02M 1/36 (2007.01)
H02M 3/156 (2006.01)

(52) U.S. Cl.
CPC *G05F 1/468* (2013.01); *G05F 1/46* (2013.01); *H02M 1/36* (2013.01); *H02M 3/156* (2013.01)

(58) Field of Classification Search
CPC ... H02M 3/1588; H02M 1/36; Y02B 70/1466
USPC .......... 323/222, 274, 277, 282–290, 299, 901
See application file for complete search history.

(56) References Cited

U.S. PATENT DOCUMENTS

| | | | |
|---|---|---|---|
| 3,959,714 A | 5/1976 | Mihelich | |
| 4,806,842 A | 2/1989 | Bittner | |
| 5,264,782 A | 11/1993 | Newton | |
| 5,453,921 A * | 9/1995 | Shutts | 363/21.18 |
| 5,710,697 A * | 1/1998 | Cooke et al. | 363/21.11 |
| 5,966,003 A * | 10/1999 | Takimoto et al. | 323/224 |
| 5,982,645 A * | 11/1999 | Levran et al. | 363/37 |
| 6,198,258 B1 | 3/2001 | Ando et al. | |
| 6,229,289 B1 | 5/2001 | Piovaccari et al. | |
| 6,377,480 B1 | 4/2002 | Sase et al. | |
| 6,813,170 B2 * | 11/2004 | Yang | 363/56.09 |
| 6,954,056 B2 * | 10/2005 | Hoshino | H02J 7/0065 323/285 |
| 7,019,507 B1 * | 3/2006 | Dittmer et al. | 323/284 |
| 7,057,380 B2 * | 6/2006 | Kuo | H02M 1/38 323/282 |
| 7,088,078 B2 * | 8/2006 | Liu | 323/207 |

(Continued)

OTHER PUBLICATIONS

Invitation to Pay Additional Fees and, Where Applicable, Protest Fee and Results of the Partial International Search, PCT/US2014/011577, date of mailing May 8, 2014, 6 pages.

(Continued)

*Primary Examiner* — Rajnikant Patel
(74) *Attorney, Agent, or Firm* — Daly, Crowley, Mofford & Durkee, LLP

(57) ABSTRACT

A regulator control circuit includes a switch control signal generator to generate a switch control signal and a soft start circuit to generate a soft start signal for use by the switch control signal generator. The soft start circuit includes a soft start controller and a decreasing circuit to decrease the soft start signal in response to the soft start controller. The soft start controller may comprise a non-regulation detector to detect a non-regulation condition. Embodiments include decreasing the soft start signal in response to a non-regulation condition lasting a predetermined time, detecting the non-regulation condition in response to a maximum duty cycle of the regulator switch, generating a soft start level indicator to control decreasing the soft start signal, and maintaining the soft start signal at a predetermined relationship with respect to a feedback signal.

33 Claims, 7 Drawing Sheets

(56) References Cited

U.S. PATENT DOCUMENTS

| | | | |
|---|---|---|---|
| 7,633,274 B2 * | 12/2009 | Nishino | H02M 3/156 323/222 |
| 7,898,830 B1 | 3/2011 | Casey et al. | |
| 7,916,503 B2 * | 3/2011 | Hasegawa et al. | 363/16 |
| 8,138,738 B2 | 3/2012 | Kunc et al. | |
| 8,145,934 B1 | 3/2012 | Ferris et al. | |
| 8,183,894 B2 * | 5/2012 | Nuttinck | H03B 19/14 327/113 |
| 8,519,691 B2 | 8/2013 | McCloy-Stevens | |
| 8,669,748 B2 * | 3/2014 | Ishii | H02M 1/36 323/271 |
| 2004/0245974 A1 | 12/2004 | Kitani et al. | |
| 2005/0024033 A1 | 2/2005 | Nakata | |
| 2005/0110469 A1 | 5/2005 | Inaba et al. | |
| 2005/0253568 A1 * | 11/2005 | Morimoto | 323/282 |
| 2006/0239045 A1 | 10/2006 | Chen et al. | |
| 2011/0009171 A1 | 1/2011 | Watanabe et al. | |
| 2011/0221415 A1 * | 9/2011 | Otsuka et al. | 323/283 |

OTHER PUBLICATIONS

International Search Report and Written Opinion dated Nov. 5, 2014 for International Application No. PCT/US2014/011577; 21 pages.

International Preliminary Report on Patentability dated Aug. 13, 2015 for International Application No. PCT/US2014/011577, 6 pages.

* cited by examiner

SOFT START CIRCUITS AND TECHNIQUES

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to regulators and, more particularly, to regulators having a soft start feature.

BACKGROUND OF THE INVENTION

Regulators, or converters, including a switch, sometimes referred to as a power switch, for transferring energy from an input, such as an AC or DC voltage or current source, to a regulated output are well known. In some regulators, sometimes referred to as switching regulators, the switch turns on and off to regulate the output. In other regulators, sometimes referred to as linear regulators, the switch operates in its active, or saturation region.

Common switching regulator configurations include Buck, Boost, Buck-Boost, flyback, SEPIC, Cúk, half bridge, and full bridge to name a few. As is also well known, various control methodologies for controlling conduction of the power switch can be applied to switching regulators, including Pulse Width Modulation (PWM) and Pulse Frequency Modulation (PFM), and for each of these control methodologies, various feedback and feed forward techniques are possible including voltage mode control and current mode control.

Some switching regulators include an error amplifier which is responsive to a reference signal and to a feedback signal proportional to the regulator output to generate an error signal. The error signal is then used to generate the switch control signal. For example, in the case of voltage mode PWM control, the error signal is compared to a ramp signal to generate the switch control signal with a duty cycle suitable for regulating the output voltage to the desired level.

Many conventional switching regulators include a so-called "soft start" feature whereby the regulator output is ramped up slowly in order to avoid large and potentially damaging inrush current and/or voltage overshoot when power is applied to the regulator. One common way of achieving soft start is by slowly ramping up a reference voltage to the error amplifier, such as by slowly charging a capacitor through a resistor with the RC network having a time constant selected to ensure that inrush current is limited. By applying a slowly rising reference to the error amplifier, the regulator output increases slowly, and thus the current is reduced according to $I=C \cdot dv/dt$ due to the smaller $dv/dt$. The slow ramping of the reference voltage can also be achieved with a charge pump, digital-to-analog converter (DAC), or other methods known to those skilled in the art.

Dropout refers to a condition in which the regulator input falls to a level that is too low to allow for satisfactory output regulation. For example, dropout voltage is a term sometimes used to describe the minimum input voltage that is required to maintain output voltage regulation. Since recovery from a dropout condition requires the regulator to operate at maximum duty cycle following a period of operating with less than sufficient input, significant inrush current and/or voltage overshoot can occur.

SUMMARY OF THE INVENTION

One aspect of the invention provides a circuit for generating a soft start signal to control conduction of a regulator switch, wherein the soft start signal is decreased in response to a non-regulation condition associated with an output of the regulator lasting for a predetermined period of time. The circuit may include a non-regulation detection circuit configured to detect the occurrence of the non-regulation condition and a decreasing circuit for decreasing the soft start signal to a level having a predetermined relationship with respect to a level of a feedback signal that is proportional to the output. The non-regulation detection circuit can detect the occurrence of the non-regulation condition in response to at least one of: a maximum duty cycle request, a voltage at the output falling below a first predetermined level, an input voltage to the regulator falling below a second predetermined level, and/or a voltage across terminals of the regulator switch falling below a third predetermined level. The non-regulation detection circuit may be further configured to detect that the non-regulation condition is no longer present.

According to a further aspect of the invention, a switching regulator control circuit includes a circuit configured to generate a control signal to control conduction of the regulator switch at a duty cycle and having first input responsive to at least one of a reference signal or a soft start signal, a second input responsive to a feedback signal proportional to the regulated output, and an output at which the control signal is provided. The switching regulator control circuit further includes a soft start circuit configured to generate the soft start signal, a non-regulation detection circuit configured to detect a non-regulation condition in response to the duty cycle being a maximum duty cycle, and a decreasing circuit configured to decrease the soft start signal in response to the detection of the non-regulation condition.

In some embodiments, the decreasing circuit is configured to stop decreasing the soft start signal in response to a soft start level indicator generated by a comparator that may be responsive to the soft start signal and to the feedback signal. The soft start circuit may include an increasing circuit configured to increase the soft start signal in response the soft start level indicator. The increasing circuit may increase the soft start signal for a predetermined period of time. The decreasing circuit may be configured to decrease the soft start signal in response to the detection of the non-regulation condition having lasted for a predetermined period of time. In some embodiments, the non-regulation condition is at least one of a dropout condition or a pre-biased startup condition.

According to a further aspect of the invention, a regulator control circuit includes an error amplifier configured to generate an error signal to control conduction of a regulator switch and having first input responsive to at least one of a reference signal or a soft start signal, a second input responsive to a feedback signal proportional to the regulated output, a first output at which the error signal is provided, and a second output at which a soft start level indicator is provided. The soft start level indicator is indicative of the soft start signal having a predetermined relationship with respect to the feedback signal. The regulator control circuit further includes a soft start circuit generating the soft start signal and including a decreasing circuit configured to decrease the soft start signal until the soft start level indicator transitions.

The soft start circuit may include a capacitor across which the soft start signal is provided and non-regulation detection circuit configured to detect a non-regulation condition, wherein the decreasing circuit is configured to discharge the capacitor beginning in response to the detection of the non-regulation condition lasting for a predetermined period of time. In one embodiment, the soft start level indicator is at a first signal level when the soft start signal is a predetermined offset amount greater than the feedback signal and at a second signal level when the soft start signal is not greater than the feedback signal by the predetermined offset amount and the discharge circuit is configured to discharge the capacitor for a period of time ending when the soft start level indicator transitions from the first signal level to the second signal level. The charge circuit may be configured to charge the capacitor in response the soft start level indicator for a predetermined period of time.

According to yet another aspect of the invention, a regulator control circuit includes a circuit configured to generate a control signal to control conduction of a regulator switch and having first input responsive to at least one of a reference signal or a soft start signal, a second input responsive to a feedback signal proportional to the regulated output, and an output at which the control signal is provided. The regulator control circuit further includes a soft start circuit generating the soft start signal, a comparator coupled to the feedback signal and to the soft start signal and configured to provide a soft start level indicator that transitions when the soft start signal is at a predetermined relationship with respect to the feedback signal, a first circuit configured to ramp the soft start signal in a first direction until the soft start level indicator transitions, and a second circuit configured to ramp the soft start signal in a second, opposing direction for a predetermined period of time after the soft start level indicator transitions.

In one embodiment, the soft start level indicator is provided at a first signal level when the soft start signal is a predetermined offset amount greater than the feedback signal and at a second signal level when the soft start signal is not greater than the feedback signal by the predetermined offset amount. In one embodiment in which the circuit is an error amplifier, the soft start level indicator is provided at a second output of the error amplifier. In some embodiments, the soft start circuit includes a capacitor across which the soft start signal is provided, the first circuit may be a charge circuit, and the second circuit may be a discharge circuit. Alternatively, the first circuit may be a discharge circuit and the second circuit is a charge circuit.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
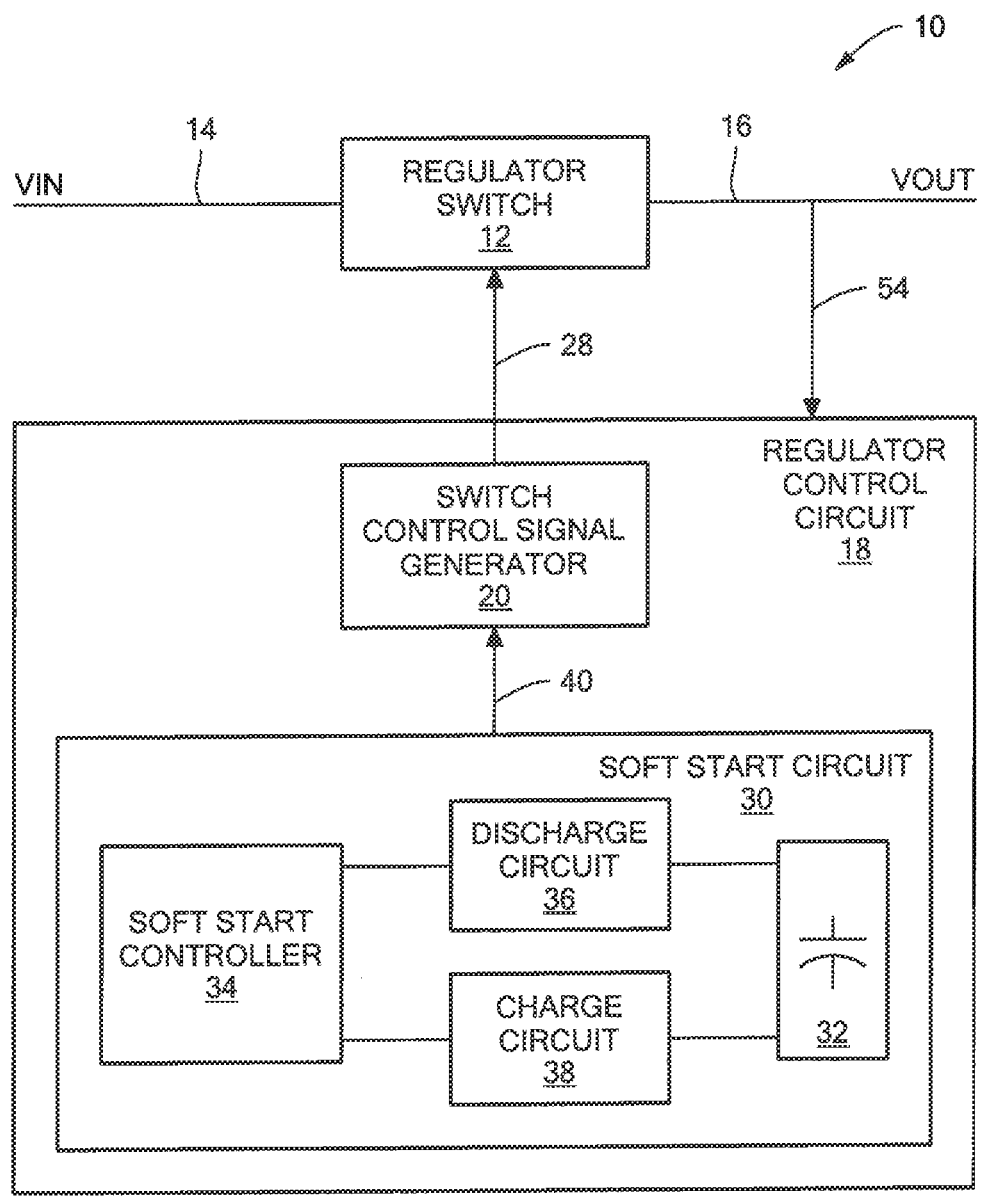
FIG. 1 is a block diagram of a regulator containing a soft start circuit.

Referring to FIG. 1, a regulator 10 includes a regulator switch 12 that conducts to transfer energy from an input source 14 to an output 16 at which a regulated output is provided. A regulator control circuit 18 includes a switch control signal generator 20 to generate a switch control signal 28 to control conduction of the switch 12 and a soft start circuit 30 to generate a soft start signal 40 for use by the switch control signal generator 20. In some embodiments, the soft start circuit 30 includes a soft start capacitor 32 across which the soft start signal is provided, a soft start controller 34, a discharge circuit 36 to discharge the capacitor in response to the soft start controller, and a charge circuit to charge the capacitor in response to the soft start controller.

The soft start controller 34 may take the form of a non-regulation detector to detect the occurrence of a non-regulation condition associated with the output 16, in which case the discharge circuit 36 discharges the capacitor in response to detection of a non-regulation condition. A non-regulation condition occurs when the regulator output cannot be maintained within its regulation range, such as when the input voltage decreases or when the regulator is intentionally shut down (e.g., to conserve power in response to a user command) and resumes operation from a pre-biased condition where the output voltage is greater than zero. More generally however, the soft start controller 34 can control discharging the capacitor whenever it is desirable to have the soft start signal at or near the feedback signal, including under normal regulation conditions, since maintaining the soft start signal at or near the feedback signal can result in a quicker recovery from a non-regulation condition.

Embodiments include discharging the soft start capacitor 32 in response to a non-regulation condition lasting a predetermined period of time, detecting the non-regulation condition in response to a duty cycle of the regulator switch 12 being a maximum duty cycle, generating a soft start level indicator with the switch control signal generator 20 to control discharging the soft start capacitor, and maintaining the soft start signal 40 at a predetermined relationship with respect to a feedback signal 54 that is proportional to the output 16 by ramping the soft start signal in a first direction until the soft start level indicator transitions and in a second, opposite direction for a predetermined period of time after the soft start level indicator transitions.

The methods used in soft start circuit 30 may also be applied to circuits using a digital to analog converter (DAC) with a counter, charge pump, and other methods to realize the ramping soft start signal. For example, in embodiments in which a DAC is used, the terms charging and discharging the soft start voltage refer generally to incrementing and decrementing the counter for a soft start ramp realized with a DAC. Charge and discharge techniques can also be applied to a charge pump by controlling the polarity of voltages used in the charge pump. These methods may also be applied to regulator control circuits 18 realized fully with digital logic or software. An inductor may also be used to realize the ramping soft start signal if a constant voltage is applied across the inductor and its current is monitored for the ramping current. As a result, the discharging and charging described herein in connection with the illustrative embodiments including a soft start capacitor may be more generally referred to as decreasing and increasing the soft start signal. Accordingly, the discharge circuit and the charge circuit may be more generally referred to as the decreasing circuit and the increasing circuit, respectively.

Regulators of various types will benefit from the soft start circuit 30 and related techniques described herein, which circuits and techniques are most generally applicable to any regulator which uses a soft start scheme to control the regulator at power up. For example, the regulator 10 may be a switching regulator, such as the type shown in FIG. 2, or a linear regulator, such as the type shown in FIG. 6. Furthermore, the regulator 10 may be an AC to DC regulator in which the input source 14 is an AC voltage or current source, a DC to DC regulator in which the input source 14 is a DC voltage or current source, a current regulator providing a regulated current at the output 16, or a voltage regulator providing a regulated voltage at the output 16, as examples.

Figure 2:
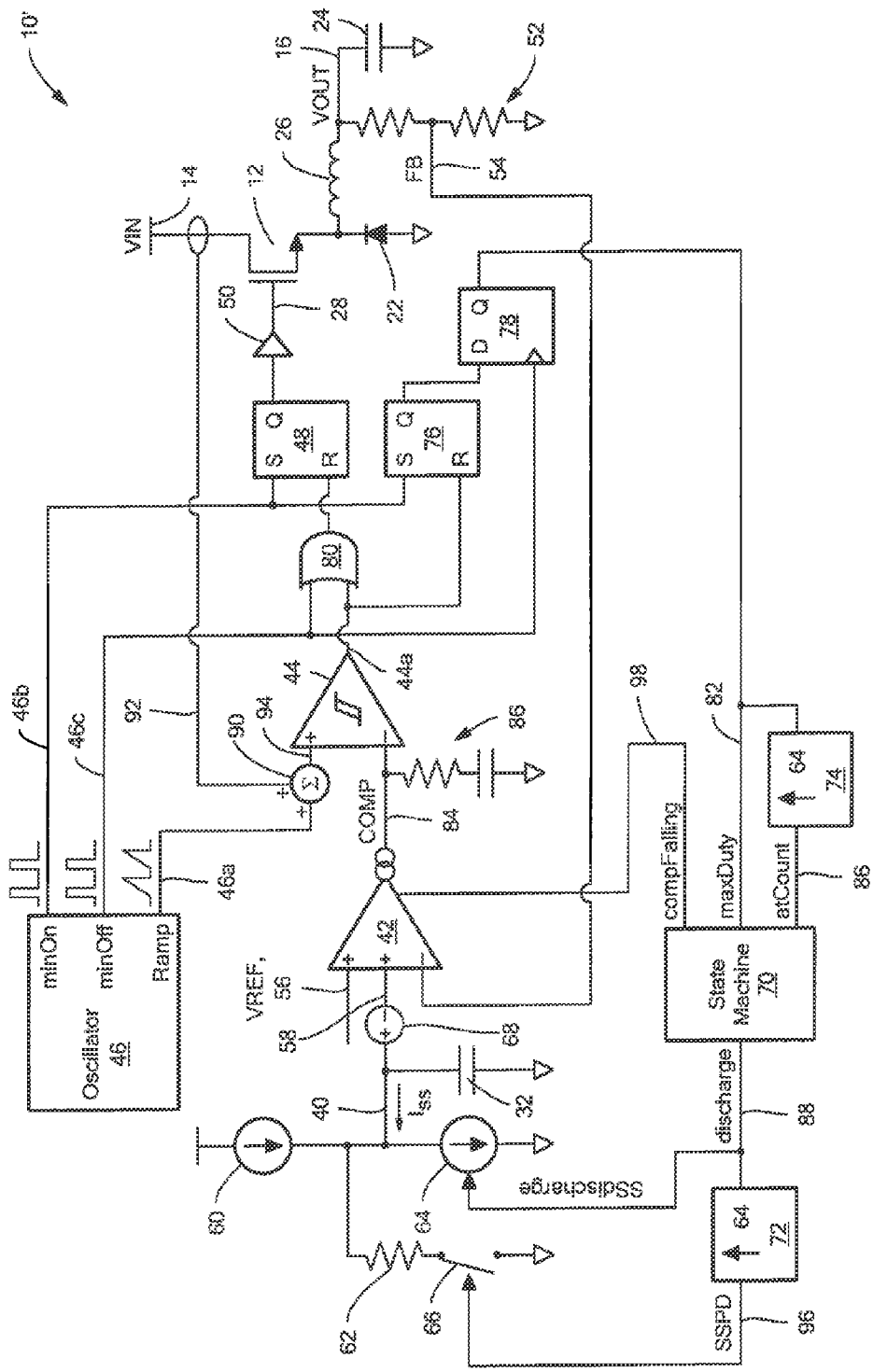
FIG. 2 is a simplified schematic of a switching regulator according to an embodiment.

Referring to FIG. 2, in which like elements are labeled with like reference numbers, a switching voltage regulator 10' is coupled to an input voltage source 14, VIN, and includes a switch 12, a diode 22, and an output capacitor 24 across which a regulated output voltage 16, VOUT, is provided. An inductor 26 is coupled between the switch 12 and the regulator output 16. The illustrative regulator 10' is a Buck regulator and the switch 12 is here shown to be a Metal Oxide Field Effect Transistor (MOSFET); however, it will be appreciated by those of ordinary skill in the art that the regulator and switch can take various forms.

The switch 12 conducts at a duty cycle $D_T$ established by the switch control signal 28 coupled to a control terminal of the switch, here a gate terminal of the FET, so as to maintain the output voltage VOUT to within a specified voltage range, referred to alternatively as the regulation range. Switch control signal generator, including error amplifier 42, comparator 44, OR gate 80, oscillator 46, latch 48, and buffer 50, is configured to generate the switch control signal 28.

Various feedback (and/or feed forward) schemes can be used to establish the switch control signal 28, such as voltage mode or current mode as in the illustrative example. To this end, a resistor divider 52 coupled to the regulator output 16 is used to establish a feedback signal 54, FB, that is proportional to the output voltage VOUT and is coupled to an inverting input of the error amplifier 42. A second, non-inverting input of the error amplifier 42 receives a reference voltage 56, VREF, and a third, non-inverting input of the error amplifier receives the soft start signal 40.

Output signals of the oscillator 46 include a minOn signal 46b and a minOff signal 46c. The minOn signal 46b contains pulses that initiate each switch cycle and occur with an on time corresponding to the minimum duty cycle necessary to ensure proper switch operation, as may be dictated by gate drive limitations of switch 12 for example. The minOff signal 46c contains pulses each of which occurs at a time following the beginning of each switch cycle by an offset time, which offset time corresponds to a maximum permissible duty cycle, as may be dictated by various factors, such as bootstrap considerations in high side switching regulator topologies, and switch control circuit response time and delay considerations.

The duty cycle is controlled by the current loop comparator 44 which resets the SR latch 48 when the inductor current crosses the level set by error amp 42 (COMP 84). This method results in COMP signal 84 being proportional to the load current, which in turn results in excellent line regulation and transient response. The oscillator includes additional output, Ramp 46a, which is used to prevent duty cycle perturbations above 50% duty cycle by summing a small artificial ramp with the inductor current.

In operation, the output of the error amplifier 42 provides an error, or COMP, signal 84 in the form of a current that charges a capacitor in a series-coupled resistor capacitor arrangement 86 to provide an input signal to the comparator 44, as shown. More particularly, the non-inverting input to the error amplifier that has the lower voltage level will control the error amplifier output signal 84. In this way, providing the soft start signal 40 in the form of a slowly rising ramp causes the regulator control loop to reach regulation over a longer period of time established by the soft start capacitor time constant, to thereby prevent large inrush current and voltage overshoot since the soft start signal 40 governs the error signal 84 until the soft start signal exceeds the reference voltage 56 by offset 68. Once the soft start signal 40 reaches the reference voltage level, the reference voltage takes over to control the error signal 84 and thus the soft start signal is held at a higher voltage level (by the current source 60) until it is next needed to govern the regulator duty cycle. Typically the soft start ramp is enabled by pulled down switch 66 when a fault condition occurs, such as when the input voltage is too low. It will be appreciated that while a multiple input error amplifier 42 is here used to control the handoff from the soft start ramp signal 40 to the reference voltage VREF, other mechanisms for achieving the same result, such as the use of a multiplexer controlled by a comparator for example, are possible.

It will also be appreciated that alternative methods of generating the switch control signal 28 with a soft start feature are possible. As one example, a comparator only may be used (in place of the error amplifier 42 and comparator 44 combination), whereby soft start is implemented by slowly ramping up the reference voltage to the comparator.

In PWM fashion, the comparator 44 compares the error signal 84 to the inductor current signal 92 to thereby generate a comparator output signal 44a. In operation, the latch 48 is set at the start of each switching cycle by the minOn signal 46b and is reset by a transition of the comparator output signal 44a unless the output voltage VOUT is so low that the error signal 84 calls for a duty cycle greater than the maximum duty cycle established by the minOff signal 46c, in which case, the latch 48 is reset by the minOff signal (via the OR gate 80). The buffered output of the latch 48 provides the switch control signal 28, as shown. It will be appreciated by those of ordinary skill in the art that while the illustrative regulator 10' implements PWM control, regulation may alternatively be achieved in other ways, such as by controlling the frequency of operation of the switch 12, which may be referred to as Pulse Frequency Modulation, or PFM.

The soft start circuitry of FIG. 2 is configured and operative to control conduction of the switch 12 both when the regulator is powered up (i.e., the output voltage rises from zero volts) and also when a non-regulation condition occurs. The soft start capacitor 32 is charged by a first current source 60 and is discharged by a second current source 64 and optionally also through a resistor 68 coupled to ground through a switch 70, as shown. Control of the soft start functionality is achieved here with a state machine 70, counters 72, 74, a latch 76, and a flip-flop 78, configured as shown. Operation of the soft start feature will be described with reference to both FIG. 2 as well as to the illustrative waveforms of FIG. 3.

When regulator 10' is powered up at a time $T_1$ (FIG. 3), the input voltage 14 and input current $I_{IN}$ begin to rise. Also at time $T_1$, the soft start capacitor 32 is charged by current source 60 with a current $I_{SS}$ at a rate established by capacitor 32, so that between time $T_1$ and time $T_2$, the soft start signal 40 is less than the reference voltage VREF 56 and thus, the COMP signal 84 rises slowly in proportion to the difference between the feedback signal 54 and the rising soft start signal.

By a time $T_2$, the output voltage 16 has reached regulation and the soft start signal 40 has exceeded the reference voltage 56. Thus, at time $T_2$, the COMP signal 84 is adjusted to drive the error down between the feedback signal 54 and the fixed reference voltage VREF by setting the proper peak inductor current. Once the reference voltage 56 takes over control of the feedback loop, the soft start signal 40 continues to ramp high until current source 60 turns off.

At a time $T_3$, the input voltage VIN begins to fall as can occur for various reasons. The input voltage source VIN has enough headroom to maintain the output voltage VOUT within the regulation range with some loss of input voltage, but by a time $T_4$, there is no longer a high enough input voltage to maintain the output voltage within the regulation range and the output voltage begins to fall. The feedback signal 54 falls as the output voltage falls, thus causing the error signal COMP 84 to rise as the difference between the feedback signal 54 and the reference voltage VREF increases. As the error signal 84 rises, the duty cycle of the switch control signal 28 increases in an effort to increase the switch conduction time and thus, the output voltage.

Figure 3:
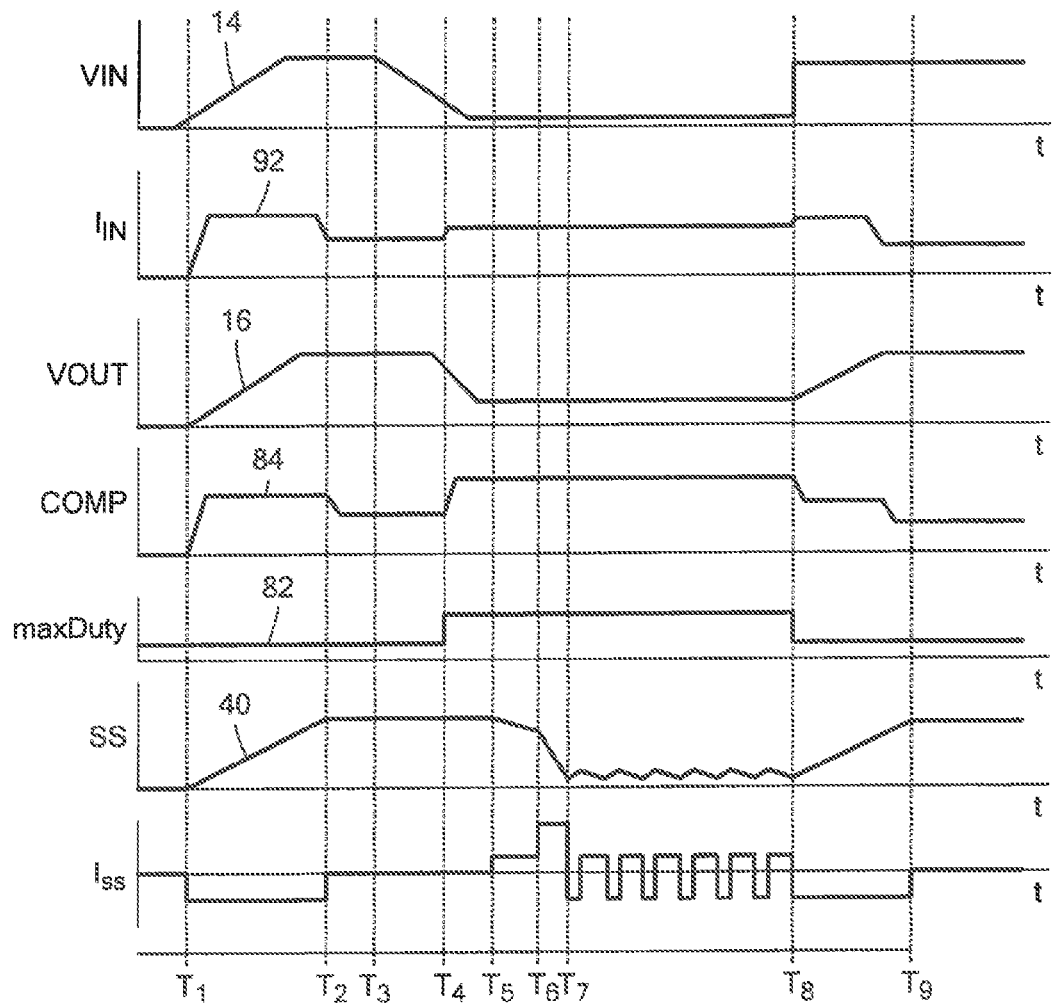
FIG. 3 shows several illustrative waveforms associated with the regulator of FIG. 2.

In the embodiment of FIG. 2, the soft start controller 34 takes the form of non-regulation detection circuitry, here including, latch 76, flip-flop 78, and counter 74, is configured to detect the occurrence of a non-regulation condition (i.e., a condition where the output is out of its regulation range) and further to detect when a non-regulation condition has lasted for a predetermined period of time. In one embodiment, a non-regulation condition is considered to have occurred when the regulator 10' operates at a maximum duty cycle since, during a non-regulation condition, a switch mode regulator will operate at its maximum duty cycle until the output voltage returns to the specified regulation range. To this end, the latch 76 is set by the minOn signal 46b at the beginning of each switch cycle, is reset by a transition of the comparator output 44a, and is clocked by the minOff signal 46c so as to be sampled at a time of maximum duty cycle operation to determine if the comparator output has transitioned. In this way, the output of the latch 78, referred to herein as the maxDuty signal 82, is a logic signal that is at a first level when the regulator feedback loop calls for a maximum switch duty cycle and is at a second level otherwise. As shown in FIG. 3, at time $T_4$, a non-regulation condition is detected to have occurred as indicated by the maxDuty signal 82 transitioning.

Counter 74 is reset by an edge of the maxDuty signal 82 (e.g., every time the duty cycle is not at its maximum or every time the maxDuty signal 82 transitions to a logic low level) and is incremented by a clock signal, such as once each switch cycle by the minOff signal 46c or the minOn signal 46b from the oscillator 46, so that the counter output signal 86, atCount, is a logic signal that changes state when the maxDuty signal 82 has indicated a maximum duty cycle condition for a predetermined period of time, here illustrated by time period $T_5$-$T_4$. In one illustrative embodiment, the predetermined period of time corresponds to sixty-four switch cycles, or 128 μsec for a 500 KHz converter. More generally however, given that the crossover frequency of the control loop is typically set at one tenth the switching frequency, the predetermined period of time is on the order of 50 to 1000 switching cycles to provide enough time for the control loop to settle and ensure that the non-regulation detection was not caused by a transient event on the regulator input or output, but rather represents a valid non-regulation condition.

It will be appreciated by those of ordinary skill in the art that various other methodologies for detecting the occurrence of a non-regulation condition are possible. For example, the output voltage 16 may be monitored and a non-regulation condition determined to have occurred when the output voltage falls to a predetermined level below its specified regulation range. Alternatively, the input voltage 14 may be monitored and a non-regulation condition determined to have occurred when the input voltage falls to a predetermined level corresponding to the minimum input voltage level necessary to maintain to the switching regulator output in its specified regulation range (i.e., the dropout voltage). Alternatively, the error signal level could be monitored to detect a non-regulation condition. A combination of these methods may also be used to determine the dropout condition, such as using the input and output voltage to calculate the duty cycle.

Once the non-regulation condition is determined to have occurred and has lasted for the predetermined period of time, the soft start capacitor 32 is discharged to just above the level of the feedback signal 54 in order to get the soft start capacitor ready to control the regulator duty cycle upon recovery from the non-regulation condition, but not disturb the COMP 84 voltage and alter the dropout voltage even further. This provides a more controlled recovery that is not susceptible to large inrush currents and voltage overshoot than otherwise possible. To this end, at time $T_5$, the state machine 70 provides a discharge signal 88 to activate current sink 64 to discharge the capacitor 32.

Since the soft start signal 40 was at or near the high supply rail prior to the occurrence of the non-regulation condition, it may be desirable to discharge the capacitor 32 at a slower rate initially after detection that a non-regulation condition has lasted a predetermined period of time (with current sink 64) and then at a faster rate through pull-down resistor 62, only if the soft start voltage does not approach the feedback signal, thereafter in order to bring the soft start voltage to approximately the feedback signal level quickly in order for the soft start capacitor to be ready for recovery from the non-regulation condition. In the illustrative embodiment, pull-down resistor 62 is coupled to ground by a switch 66 under the control of an SSPD signal 96 provided by a counter 72. Counter 72 causes the SSPD signal 96 to transition to close the switch 66 once the discharge signal 88 has been asserted for a predetermined period of time. Typically the SSPD signal is used under fault conditions to quickly reset the soft start voltage under fault conditions, such as under voltage lockout (UVLO) for the input voltage.

The beginning of this faster soft start discharge period is shown in FIG. 2 to occur at a time $T_6$. In the illustrative embodiment, this predetermined period following detection of a non-regulation condition lasting a predetermined period of time (at time $T_5$) at which the faster discharge period begins (at time $T_6$) is established by counter 72 and occurs a predetermined number of switch cycles (such as 64 switch cycles) after discharging of the capacitor begins. More generally, this faster discharge period may be initiated at the predetermined time $T_6$-$T_5$ after detecting that a non-regulation condition has lasted a predetermined period time or at a predetermined period of time after the smaller discharge current has been used and no response/recovery of the output voltage is detected.

The soft start capacitor 32 continues to be discharged in this manner, both through the resistor 62 and by current sink 64, until the soft start signal 40 reaches approximately the level of the feedback signal 54. More generally, the capacitor 32 is discharged until the soft start signal level is at a predetermined relationship with respect to the feedback signal.

In the illustrative embodiment, a determination is made that capacitor discharging should end by a soft start level indicator provided in the form of a compFalling signal 98 by the error amplifier 42. Generation of the soft start level indicator 98 will be described in greater detail in connection with the illustrative error amplifier of FIG. 4. Suffice it to say here however that the soft start level indicator 98 is a logic signal that is at a first signal level when the soft start signal 40 is greater than the feedback signal 54 by a predetermined offset amount and transitions to a second signal level when the soft start signal 40 is not greater than the feedback signal by the predetermined offset amount. To this end, the soft start signal 40 may be coupled to an offset voltage source 68, which offset voltage source establishes the predetermined offset amount, to provide a signal 58 that differs from the soft start signal 40 by the predetermined offset amount for coupling to the non-inverting error amplifier input.

Figure 4:
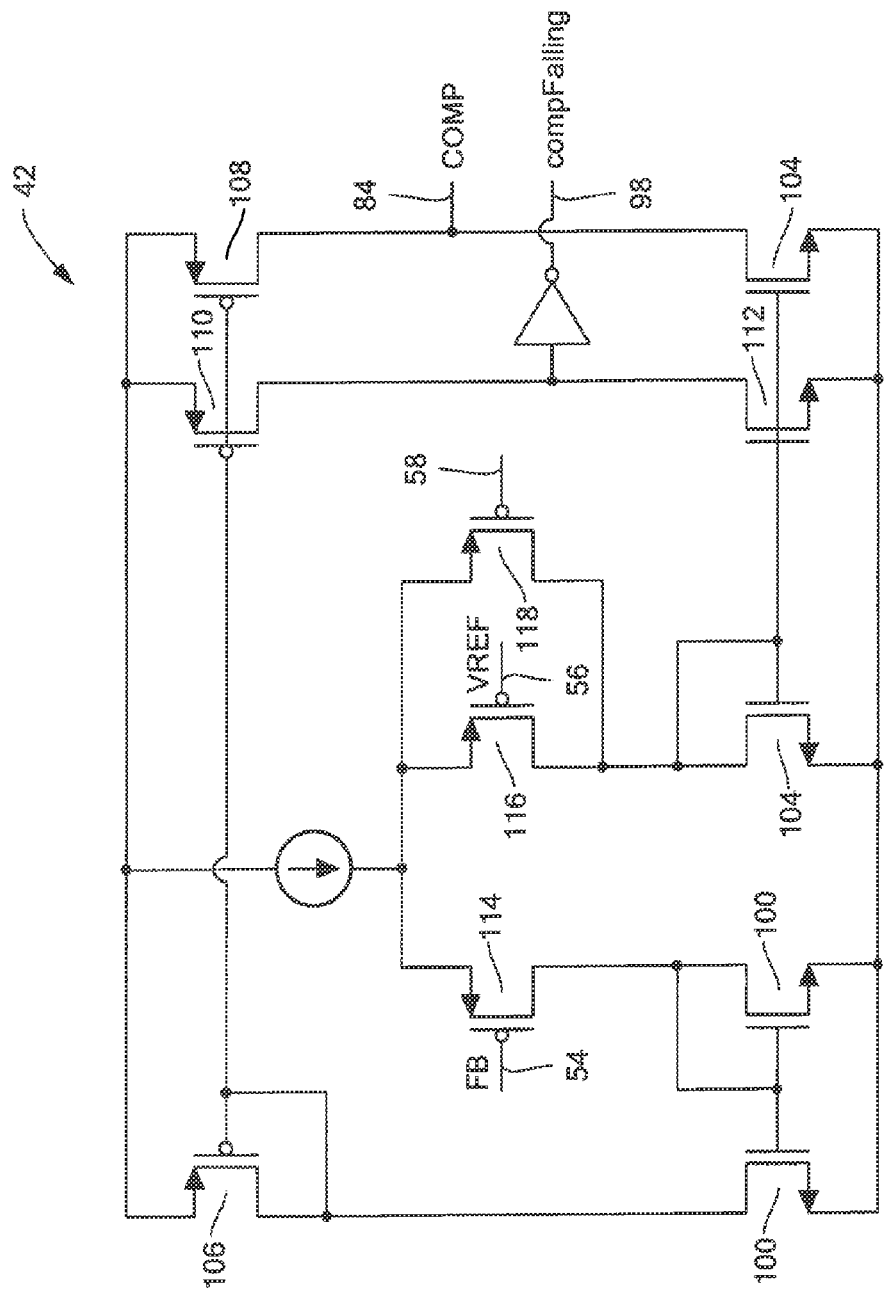
FIG. 4 is a schematic of an illustrative error amplifier for use with the regulator of FIG. 2.

Referring now to FIG. 4, an illustrative error amplifier 42 is shown with input devices 114, 116, and 118 coupled to the feedback signal 54, the reference voltage 56, and the offset soft start signal 58, respectively. With the use of current mirror arrangements 100, 104, and respective series coupled transistors, 106, 108, the COMP error signal 84 is provided as the difference voltage between the feedback signal 54 and the lower one of the reference voltage 56 and the offset soft start signal 58. The soft start voltage offset, 68, is implemented by realizing devices 114 and 116 with higher threshold (vt) devices than device 118.

An additional series-coupled transistor pair including transistors 110, 112, here is configured to provide the soft start level indicator compFalling 98, as a comparison of the feedback signal 54 and the lower one of the reference voltage 56 and the offset soft start signal 58. Once the soft start signal 40 is greater than the feedback signal 54 by the offset amount, the compFalling signal 98 transitions, here at time $T_7$ (FIG. 3). Use of the error amplifier 42 to provide the compFalling signal 98 in the above-described manner can be advantageous because when the offset soft start signal 58 crosses the feedback signal 54, the compFalling signal 98 will immediately change state preventing the compensation node from moving significantly and alternating the regulation point. It will be appreciated by those of ordinary skill in the art however that other methodologies are possible for determining when the soft start signal 40 is at the predetermined relationship with respect to the feedback signal 54, such as with the use of a separate comparator that has the soft start signal 58 and the feedback signal 54 as its inputs.

While the predetermined offset amount is illustrated in FIG. 2 as being established by an offset voltage source 68, the predetermined offset amount may alternatively or additionally be established by providing the input PMOS device 118 with a different threshold voltage than the other input PMOS devices 114, 116. Thus, if the input device 118 is provided with a threshold voltage by which the predetermined offset amount is established, the offset voltage source 68 (FIG. 2) may be omitted and the soft start signal 40 may be coupled directly to the input device 118.

Use of the predetermined offset amount to establish the predetermined relationship between the soft start signal 40 and the feedback signal 54 may be desirable to ensure that the soft start signal controls the feedback loop when the regulator is powered up, particularly in configurations where an offset exists between the soft start signal and the feedback signal. For example, offset between the soft start signal 40 and the feedback signal 54 may occur in embodiments in which the regulator control circuitry is implemented on an integrated circuit and the soft start capacitor 32 is a separate, non-integrated component.

It will also be appreciated that while the above-described predetermined relationship between the soft start signal 40 and the feedback signal 54 that triggers the end of discharging the capacitor is, here, when the soft start signal is no longer greater than the feedback signal by the predetermined offset amount, other predetermined relationships are possible, such as the soft start signal being substantially equal to the feedback signal as one example.

The soft start signal 40 is maintained at the predetermined relationship with respect to of the feedback signal 54 in order be ready for recovery from the non-regulation condition in a controlled manner that is not susceptible to large inrush currents and voltage overshoot, here, by charging the capacitor 32 for a short predetermined period of time, followed by a period of discharging the capacitor in the manner described above, until the soft start level indicator 98 transitions. This results in a soft start voltage that has an average value just above the feedback voltage (including the offset). As will be explained further below, maintaining the soft start signal level at the predetermined relationship with respect to the feedback signal level continues until the input voltage VIN increases which results in the duty cycle decreasing, as occurs at time $T_8$ (FIG. 3).

Once the compFalling signal 98 transitions at time $T_7$, the discharge signal 88 transitions and ends the period of discharging capacitor 32 through resistor 62 and current source 64 and the current source 60 resumes charging the capacitor 32. The capacitor 32 is charged for a short predetermined period of time. In one embodiment, the short predetermined time during which the soft start capacitor is charged is a predetermined number of switch cycles, such as two switch cycles, as may be controlled by the state machine 70. It is important to keep the charge short to minimize the ripple on soft start providing a fast response during recovery.

After the charging interval, the discharge signal 88 again transitions to cause the capacitor 32 to be discharged and the discharging continues until the soft start signal indicator 98 transitions. During these subsequent periods of capacitor discharging that occur during the soft start maintenance interval from time $T_7$ to $T_8$, the capacitor 32 is discharged only through current sink 64 and not also through pull down resistor 62 due to the short time period not expiring delay, in order to provide low ripple on the soft start signal and minimize overshoot that could result from delays in the circuit.

Maintaining the soft start signal 40 at the predetermined relationship with respect to the feedback signal level 54 by charging the capacitor 32 for a short duration and then discharging the capacitor until the soft start level indicator 98 transitions continues until the input voltage recovers, here at a time $T_8$. More particularly, at time $T_8$, the maxDuty signal 82 transitions, indicating that the control loop is no longer calling for maximum switch duty cycle.

It will be appreciated by those of ordinary skill in the art that while detection of the end of a maximum duty cycle request is described herein as the triggering event to begin charging the capacitor 32 in the usual manner (continuously starting at time $T_8$ rather than for the short predetermined duration), other techniques for detecting the end of the non-regulation condition are also possible. Examples include monitoring the input voltage level, output voltage level, the error signal level, or the load current. It will also be appreciated by those of ordinary skill in the art that while the same technique is used in FIG. 2 both to detect the occurrence of a non-regulation condition and also to detect the end of the non-regulation condition (namely the maxDuty signal 82), different techniques can be used for these trigger events.

Starting at time $T_8$, the soft start capacitor 32 is charged in the same manner as occurred when the regulator was powered on at time $T_1$. At time $T_9$, the regulator output VOUT is back within the regulation range and the control loop is again governed by the reference voltage 56. With this arrangement, recovery from a non-regulation condition is achieved without large inrush current and overshoot.

It will be appreciated by those of ordinary skill in the art that maintaining the soft start voltage 40 at or near the feedback signal 54 may be achieved by other techniques. For example, time periods for charging the capacitor 32 can be controlled by adding hysteresis to the comparator portion of the error amplifier (as opposed to charging the capacitor for the short predetermined time periods). As another example, a unity gain operational amplifier with the feedback voltage 54 as its input may be used in conjunction with offset 68.

During events that result in the power converter running at the minimum duty cycle and causing the output voltage to rise up, rather than maintaining the soft start signal level 40 at the offset amount above the feedback signal 54 as described above, the soft start signal level could alternatively be maintained at a level just below the feedback signal. Controlling ramping the reference voltage back down to the regulation point is important for synchronous switch mode converters because they can have a large current sink capability. In this arrangement, once initial discharging of the soft start capacitor ends (when the soft start signal level indicator 98 transitions), the soft start signal 40 can be maintained just below the feedback signal level by further discharging the soft start capacitor for a short predetermined period of time, following which the capacitor is charged until the soft start level indicator transitions.

Figure 5:
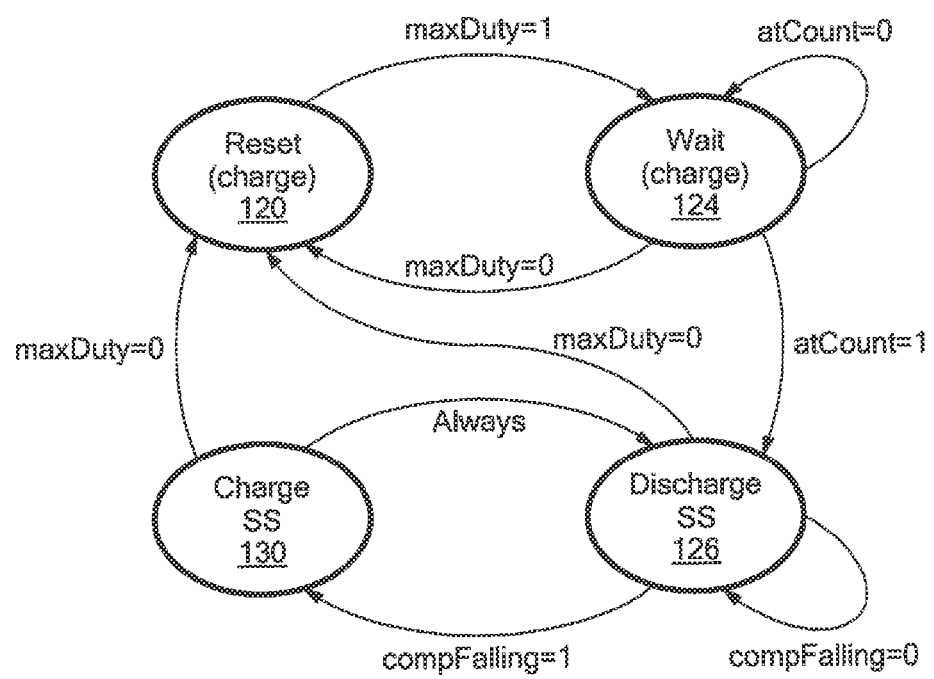
FIG. 5 is a state diagram showing an illustrative implementation of the state machine of FIG. 2.

Referring also to FIG. 5, an illustrative state diagram for control of the state machine, or state processor 70 of FIG. 2 includes four states 120, 124, 126, and 130. Recall that the state machine 70 is responsive to the soft start level indicator 98, the maxDuty signal 82, and the atCount signal 86, and provides the discharge signal 88.

In a Reset state 120, the soft start capacitor 32 is charged to its maximum value, similar to start up. In one embodiment, the maximum value of the soft start signal 40 is the positive supply rail, as occurs when the current source 60 pulls up the soft start voltage. Alternatively, the maximum value of the soft start signal 40 may be set at the reference voltage level 56 or some other level.

The state machine remains in the Reset state 120 until the maxDuty signal 82 transitions (i.e., maxDuty=1) to indicate a maximum duty cycle request, at which time the state machine moves from the Reset state 120 to a Wait state 124, indicating detection of a non-regulation condition. During the Wait state 124, the switch 12 is operated at its maximum duty cycle and the soft start capacitor 32 remains charged. At any time that the maxDuty signal 82 transitions indicating an end to the maximum duty cycle request (i.e., maxDuty=0), the state machine returns to the Reset state 120, as may occur when the input voltage increases before the non-regulation condition is verified for example.

While in the Wait state 124, the counter 74 increments upon each switch cycle until it reaches its maximum count value, which is signaled by a transition of the atCount signal 86 (i.e., atCount=1). A transition of the atCount signal 86 indicates that the detected non-regulation condition has lasted for the predetermined period of time, following which the state machine transitions to a Discharge state 126 at which time the discharge signal 88 transitions.

In the Discharge state 126, the soft start capacitor 32 is discharged until the soft start signal 40 is at the predetermined relationship with respect to the feedback signal 54 or more particularly, until the soft start level indicator 98 transitions (i.e., compFalling=1). Once the compFalling signal 98 transitions, the state machine enters the Charge state 130. If at any time during the Discharge state, the maxDuty signal 82 transitions indicating an end to the maximum duty cycle request (i.e., maxDuty=0), the state machine returns to the Reset state 120, as may occur when the input voltage increases.

In the Charge state 130, the soft start capacitor 32 is charged for the short predetermined period of time (e.g., one switch cycle) after which the state machine returns to the Discharge state 126. Recall that this process of discharging the capacitor 32 until the soft start level indicator 98 (compFalling) transitions followed by a short period of charging the capacitor to maintain the soft start voltage at the predetermined relationship with respect to the feedback signal will continue until the non-regulation condition ends and the maxDuty signal transitions (i.e., maxDuty=0), at which time the state machine returns to the Reset state 120.

Figure 6:
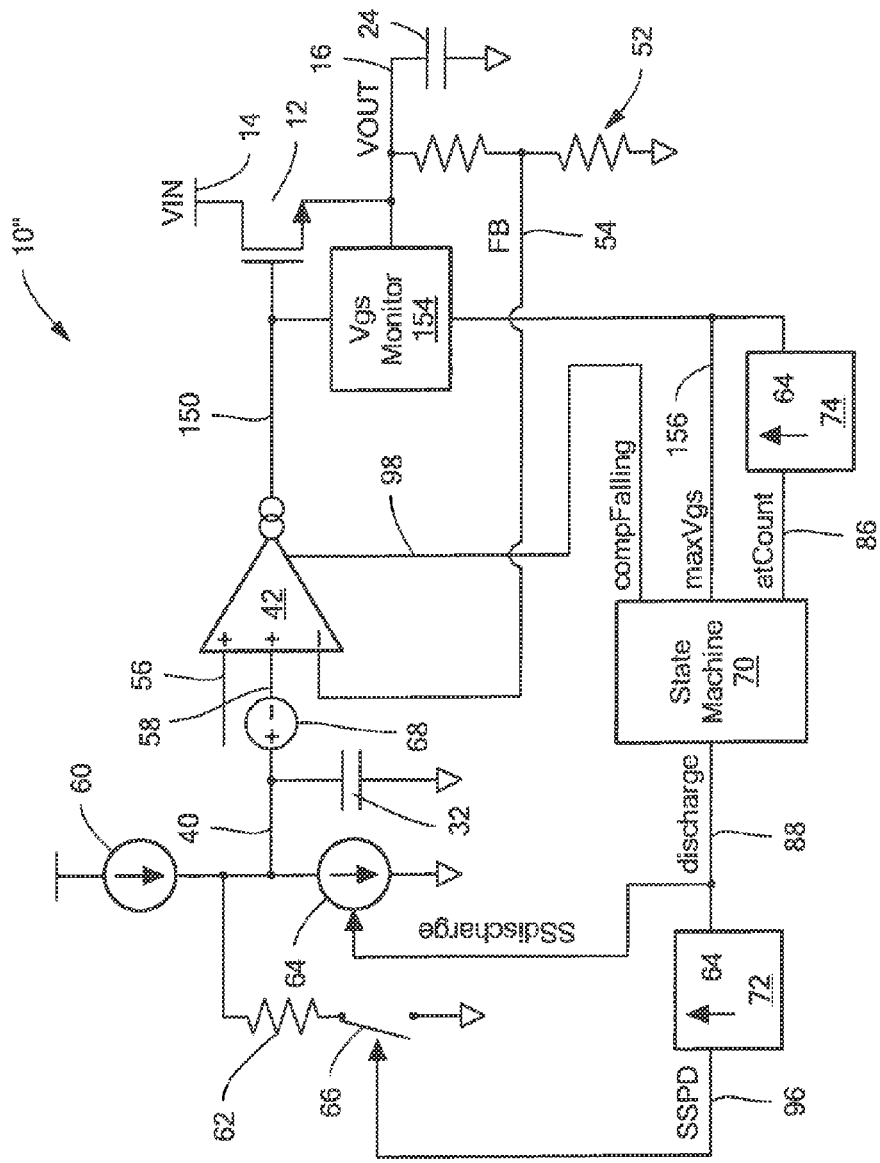
FIG. 6 is a simplified schematic of a linear regulator according to an embodiment.

Referring now to FIG. 6, in which like elements are labeled with like reference numbers, an illustrative linear regulator 10" is coupled to an input voltage source 14 and includes a switch 12, and an output capacitor 24 across which a regulated output voltage 16 is provided.

Switch 12 is configured as a source follower and conducts in its active region (sometimes referred to as the saturation region) under the control of a control signal 150 coupled to a control terminal, here a gate terminal of the FET, so as to maintain the output voltage VOUT to within a specified regulation range. The illustrative switch 12 is here shown to be a MOSFET; however, it will be appreciated by those of ordinary skill in the art that the switch can take various forms, such as a bipolar transistor or other device in the active region in which the device operates generally as a follower or in the manner of a current source. Switch control signal generator circuitry, including error amplifier 42, is configured to generate the switch control signal 150.

Resistor divider 52 coupled to the regulator output 16 is used to establish a feedback signal 54, FB, that is coupled to an inverting input of the error amplifier 42. A second, non-inverting input of the error amplifier 42 receives the reference voltage 56, VREF, and a third, non-inverting input of the error amplifier receives the soft start signal 40.

In operation, the output of the error amplifier 42 provides an error, or COMP, signal (also referred to in connection with this embodiment as the switch control signal) 150 to drive the switch 12, as shown. As in the embodiment of FIG. 2, the non-inverting input to the error amplifier 42 that has the lower voltage level will control the error amplifier output signal 150. In this way, providing the soft start signal 40 in the form of a slowly rising ramp causes the regulator control loop to reach regulation over a longer period of time, to thereby prevent large inrush current and voltage overshoot since the soft start signal governs the switch control signal 150 until the soft start signal reaches the level of the reference voltage 56. Once the soft start signal 40 reaches the reference voltage level, the reference voltage takes over to establish the switch control signal 150 and the soft start signal is held at a higher voltage level (by the current source 60) until it is next needed to govern the regulation operating point. Here again, while a multiple input error amplifier 42 is here used to control the handoff from the soft start ramp signal 40 to the reference voltage VREF, other mechanisms for achieving the same result, such as the use of a multiplexer for example, are possible.

The soft start circuitry is configured and operative to control the switch conduction both when the regulator is powered up (i.e., the output voltage rises from zero volts) and also when a non-regulation condition occurs. The soft start capacitor 32 is charged by the first current source 60 and is discharged by the second current source 64 and optionally also through the pull-down resistor 68 coupled to ground through switch 70, as shown. Control of the soft start functionality is achieved here with the state machine 70 and counters 72, 74, configured as shown.

Operation of the linear regulator soft start feature of FIG. 6 is generally the same as in the switching regulator 10' of FIG. 2, with the exception that in the linear regulator embodiment, detection of the occurrence of a non-regulation condition is achieved by monitoring the gate to source voltage of the switch 12 (rather than a maximum duty cycle request). To this end, the linear regulator 10" includes a Vgs monitor circuit 154 which is coupled across the gate and source terminals of the switch 12 and which provides a maxVgs signal 156 indicative of the gate to source voltage being at a maximum level indicating that the switch has moved from the active region (or saturation region) to the triode region. Triode region is an indication that the drain to source voltage of MOSFET 12 is very small and the regulator is likely not able to maintain the output voltage.

Figure 7:
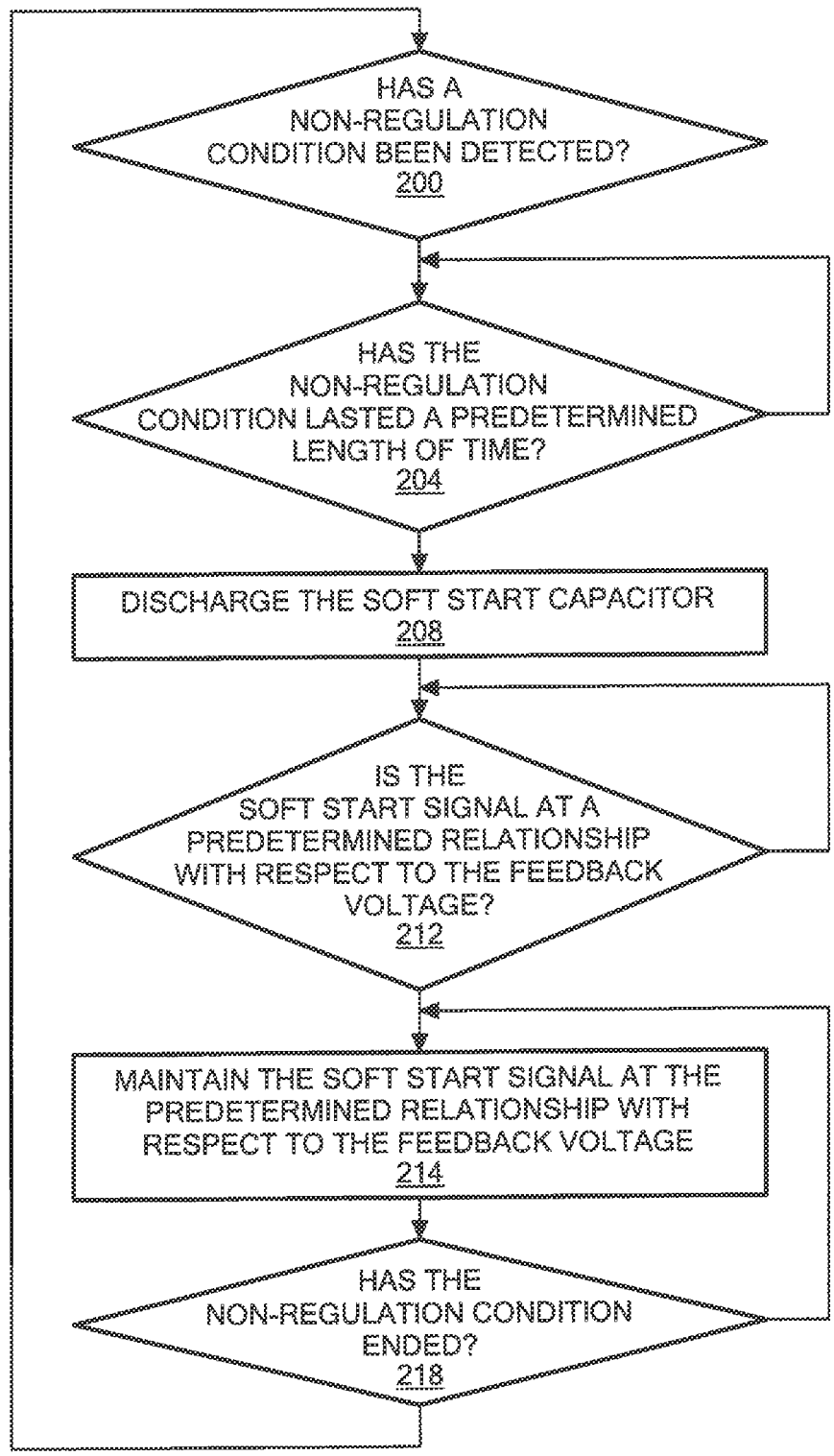
FIG. 7 is a flow diagram showing an illustrative method for implementing a soft start feature in response to the occurrence of a non-regulation condition.

Referring to FIG. 7, an illustrative method associated with the soft start circuitry described herein commences in step 200 by determining whether a non-regulation condition has been detected, such as by detecting a maximum duty cycle request (i.e., with the maxDuty signal 82 of FIG. 2) or by detecting a maximum gate to source voltage (i.e., with the maxVgs signal 156 of FIG. 6).

In step 204, it is determined whether the detected non-regulation condition has lasted for a predetermined period of time. In the illustrated embodiments, counter 74 is used to provide the atCount signal 86 that is asserted when a detected non-regulation condition has lasted for the predetermined period of time, such as for 64 switch cycles. Step 204 is repeated until the predetermined period of time has lapsed. With this arrangement, the soft start circuitry is responsive only to verified non-regulation conditions rather than spurious conditions.

Once a non-regulation condition has been detected and has lasted for the predetermined period of time, the soft start capacitor 32 is discharged in step 208, such as with the use of current sink 64 and optionally also pull-down resistor 62 as described above. The capacitor 32 is discharged until it is determined in step 212 that the soft start signal 40 has achieved a predetermined relationship with respect to the regulator feedback signal 54. In the illustrative embodiments, the predetermined relationship is achieved when the soft start signal 40 is no longer greater than the feedback signal 54 by a predetermined offset amount. Step 212 is repeated until the soft start signal 40 has achieved the predetermined relationship with respect to the regulator feedback signal 54.

Once the soft start signal 40 is at the predetermined relationship with respect to the feedback signal (as may be determined by a transition of the soft start level indicator signal 98, compFalling), the soft start signal 40 is maintained at the predetermined relationship with respect to the feedback signal 54 in step 214. In illustrative embodiments, this soft start signal level maintenance is achieved by short periods of charging the soft start capacitor 32 followed by discharging the soft start capacitor until the soft start level indicator transitions, as described above.

In step 218, it is determined whether the non-regulation condition has ended. In the illustrative embodiment of FIG. 2 for example, this determination is made in response to a transition of the maxDuty signal 82. In addition to step 218, if the non-regulation condition has ended at any time the process will go to step 200.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A circuit for generating a soft start signal to control conduction of a regulator switch of a regulator, comprising:
   a non-regulation detection circuit configured to detect a non-regulation condition in which an output of the regulator cannot be maintained within a regulation range; and
   a decreasing circuit configured to decrease the soft start signal in response to a detection by the non-regulation detection circuit of the non-regulation condition lasting for a predetermined period of time selected to ensure that the non-regulation detection was not caused by a transient event.

2. The circuit of claim 1 comprising:
   a soft start capacitor,
   wherein the decreasing circuit comprises
   a discharge circuit for discharging the capacitor to a level having a predetermined relationship with respect to a level of a feedback signal that is proportional to the output.

3. The circuit of claim 2 wherein the non-regulation detection circuit detects the non-regulation condition in response to at least one of:
   a maximum duty cycle request;
   a voltage at the output of the regulator falling below a first predetermined level associated with the output of the regulator not being within the regulation range;
   an input voltage to the regulator falling below a second predetermined level associated with the output of regulator not being within the regulation range; or
   a voltage across terminals of the regulator switch falling below a third predetermined level associated with the output of the regulator not being within the regulation range.

4. The circuit of claim 1 wherein the non-regulation detection circuit is further configured to detect that the non-regulation condition is no longer present.

5. A regulator comprising the circuit of claim 1 wherein the regulator is a linear regulator or a switching regulator.

6. The regulator of claim 5 wherein the regulator is a switching regulator and the circuit is configured to control at least one of a duty cycle or a frequency of the regulator switch.

7. The circuit of claim 1 wherein the non-regulation condition is at least one of a dropout condition or a pre-biased startup condition.

8. A switching regulator control circuit for controlling a switching regulator comprising a switch that conducts at a duty cycle to transfer energy from an input source to an output at which a regulated output having a regulation range is provided, the switching regulator control circuit comprising:
   a circuit configured to generate a control signal to control conduction of the switch at the duty cycle and having first input responsive to a soft start signal, a second input responsive to a feedback signal proportional to the regulated output, and an output at which the control signal is provided; and
   a soft start circuit generating the soft start signal, the soft start circuit comprising:
     a non-regulation detection circuit configured to detect a non-regulation condition in which regulated output cannot be maintained within the regulation range in response to the duty cycle being a maximum duty cycle; and a decreasing circuit configured to decrease the soft start signal in response to the detection by the non-regulation detection circuit of the non-regulation condition.

9. The switching regulator control circuit of claim 8 wherein the decreasing circuit is configured to stop decreasing the soft start signal in response to a soft start level indicator generated by a comparator.

10. The switching regulator control circuit of claim 9 wherein the comparator is responsive to the soft start signal and to the feedback signal.

11. The switching regulator control circuit of claim 9 wherein the soft start circuit further comprises an increasing circuit configured to increase the soft start signal in response the soft start level indicator.

12. The switching regulator control circuit of claim 11 wherein the increasing circuit is configured to increase the soft start signal for a predetermined period of time.

13. The switching regulator control circuit of claim 8 wherein the decreasing circuit is configured to decrease the soft start signal in response to the detection of the non-regulation condition having lasted for a predetermined period of time selected to ensure that the non-regulation detection was not cause by a transient event.

14. The switching regulator control circuit of claim 8 wherein to control conduction of the switching regulator switch, the circuit is configured to control at least one of a duty cycle or a frequency of the switching regulator switch.

15. The switching regulator control circuit of claim 8 wherein the non-regulation condition is a dropout condition.

16. The switching regulator control circuit of claim 8 wherein the circuit is an error amplifier or a feedback comparator.

17. The switching regulator control circuit of claim 11 wherein the soft start circuit further comprises a capacitor across which the soft start signal is provided, the decreasing circuit is a discharge circuit, and the increasing circuit is a charge circuit.

18. A regulator control circuit for controlling a regulator switch that conducts to transfer energy from an input source to an output at which a regulated output is provided, the regulator control circuit comprising:

an error amplifier configured to generate an error signal to control conduction of the switch and having first input responsive to a soft start signal, a second input responsive to a feedback signal proportional to the regulated output, a first output at which the error signal is provided, and a second output at which a soft start level indicator is provided, wherein the soft start level indicator is indicative of the soft start signal having a predetermined relationship with respect to the feedback signal; and a soft start circuit generating the soft start signal, wherein the soft start circuit comprises a decreasing circuit configured to decrease the soft start signal until the soft start level indicator transitions.

19. The regulator control circuit of claim 18 wherein the soft start circuit further comprises a capacitor across which the soft start signal is provided and a non-regulation detection circuit configured to detect a non-regulation condition in which the regulated output cannot be maintained within a regulation range, wherein the decreasing circuit is configured to discharge the capacitor beginning in response to the detection by the non-regulation detection circuit of the non-regulation condition lasting for a predetermined period of time selected ensure that the non-regulation detection was not caused by a transient event.

20. The regulator control circuit of claim 19 wherein the soft start level indicator is at a first signal level when the soft start signal is a predetermined offset amount greater than the feedback signal and at a second signal level when the soft start signal is not greater than the feedback signal by the predetermined offset amount and wherein the decreasing circuit is configured to discharge the capacitor for a period of time ending when the soft start level indicator transitions from the first signal level to the second signal level.

21. The regulator control circuit of claim 19 further comprising a charge circuit configured to charge the capacitor in response the soft start level indicator.

22. The regulator control circuit of claim 21 wherein the charge circuit is configured to charge the capacitor for a predetermined period of time.

23. The regulator control circuit of claim 18 wherein the regulator is a linear regulator or a switching regulator.

24. The regulator control circuit of claim 23 wherein the regulator is a switching regulator and the error amplifier is configured to control at least one of the duty cycle or a frequency of the regulator switch.

25. The regulator control circuit of claim 19 wherein the non-regulation condition is at least one of a dropout condition or a pre-biased startup condition.

26. A regulator control circuit for controlling a regulator switch that conducts to transfer energy from an input source to an output at which a regulated output is provided, the regulator control circuit comprising:

a circuit configured to generate a control signal to control conduction of the switch and having first input responsive to a soft start signal, a second input responsive to a feedback signal proportional to the regulated output, and an output at which the control signal is provided; and a soft start circuit generating the soft start signal, wherein the soft start circuit comprises:

a comparator coupled to the feedback signal and to the soft start signal and configured to provide a soft start level indicator that transitions when the soft start signal is at a predetermined relationship with respect to the feedback signal;

a first circuit configured to ramp the soft start signal in a first direction until the soft start level indicator transitions; and a second circuit configured to ramp the soft start signal in a second, opposing direction for a predetermined period of time after the soft start level indicator transitions.

27. The regulator control circuit of claim 26 wherein the soft start level indicator is provided at a first signal level when the soft start signal is a predetermined offset amount greater than the feedback signal and at a second signal level when the soft start signal is not greater than the feedback signal by the predetermined offset amount.

28. The regulator control circuit of claim 27 wherein the circuit configured to generate a control signal is an error amplifier or a comparator.

29. The regulator control circuit of claim 28 wherein the circuit configured to generate a control signal is an error amplifier and wherein the soft start level indicator is provided at a second output of the error amplifier.

30. The regulator control circuit of claim 26 wherein the regulator is a linear regulator or a switching regulator.

31. The regulator control circuit of claim 30 wherein the regulator is a switching regulator and the circuit is configured to control at least one of a duty cycle or a frequency of the regulator switch.

32. The regulator control circuit of claim 26 wherein the first circuit is a charge circuit and the second circuit is a discharge circuit.

33. The regulator control circuit of claim 26 wherein the first circuit is a discharge circuit and the second circuit is a charge circuit.

* * * * *

UNITED STATES PATENT AND TRADEMARK OFFICE
CERTIFICATE OF CORRECTION

PATENT NO. : 9,285,812 B2
APPLICATION NO. : 13/756922
DATED : March 15, 2016
INVENTOR(S) : Joshua Wibben et al.

It is certified that error appears in the above-identified patent and that said Letters Patent is hereby corrected as shown below:

In the Specification

Column 2, line 46 delete "response the" and replace with --response to the--.

Column 3, line 16 delete "response the" and replace with --response to the--.

Column 5, lines 24-25 delete "Metal Oxide Field Effect Transistor (MOSFET);" and replace with --Metal Oxide Semiconductor Field Effect Transistor (MOSFET);--.

Column 8, line 55 delete "period time" and replace with --period of time--.

Column 10, line 7 delete "respect to of the" and replace with --respect to the--.

Column 10, lines 7-8 delete "order be" and replace with --order to be--.

In the Claims

Column 15, lines 16-17 delete "response the" and replace with --response to the--.

Column 15, line 27 delete "cause" and replace with --caused--.

Signed and Sealed this
Twenty-third Day of August, 2016

Michelle K. Lee
*Director of the United States Patent and Trademark Office*